United States Patent [19]

Ratcliff

[11] Patent Number: 4,797,876
[45] Date of Patent: Jan. 10, 1989

[54] CONFERENCING BRIDGE

[75] Inventor: Reginald Ratcliff, Atlanta, Ga.

[73] Assignee: Solid State Systems, Inc., Kennesaw, Ga.

[21] Appl. No.: 72,254

[22] Filed: Jul. 10, 1987

[51] Int. Cl.⁴ .......................... H04J 3/02; H04M 3/56
[52] U.S. Cl. .................................................... 370/62
[58] Field of Search ................... 370/62; 379/202, 203, 379/204, 205

[56] References Cited

U.S. PATENT DOCUMENTS

| | | | |
|---|---|---|---|
| 4,109,111 | 8/1978 | Cook | 370/62 |
| 4,280,216 | 7/1981 | Zeitrag | 370/62 |
| 4,339,818 | 7/1982 | Gruenberg | 370/62 |
| 4,340,960 | 7/1982 | Moran | 370/62 |
| 4,359,603 | 11/1982 | Heaton | 370/62 |
| 4,387,457 | 6/1983 | Münter | 370/62 |
| 4,477,897 | 10/1984 | Lane | 379/202 |
| 4,509,166 | 4/1985 | Simon | 379/202 |
| 4,606,021 | 8/1986 | Wurst | 370/62 |
| 4,648,108 | 3/1987 | Ellis et al. | 379/202 |
| 4,658,398 | 4/1987 | Hsing | 370/62 |
| 4,726,016 | 2/1988 | Uchida | 370/62 |

FOREIGN PATENT DOCUMENTS

| | | |
|---|---|---|
| 2098831 | 11/1982 | United Kingdom . |
| 2134751 | 8/1984 | United Kingdom ................ 379/202 |

*Primary Examiner*—A. D. Pellinen
*Assistant Examiner*—Geoffrey S. Evans
*Attorney, Agent, or Firm*—Jones, Askew & Lunsford

[57] ABSTRACT

A conferencing bridge is provided for an electronic telephone system to support telephone conversations involving three or more parties. The conferencing bridge implements a conferencing algorithm using simple arithmetic operations. The conferencing bridge circuitry implements the algorithm by summing each party's contribution to the conference deriving a grand total, and subtracting each party's contribution from the grand total.

36 Claims, 4 Drawing Sheets

Fig_1

Fig_2

CONFERENCING BRIDGE

CROSS-REFERENCE TO RELATED APPLICATIONS

The subject matter described in this application is related to the material disclosed in co-filed U.S. patent applications Ser. Nos. 071,979 "PCM RATE CONVERTER"—LuJack Ewell; 072,249 "SPACE AND TIME SWITCH"—Reginald Ratcliff; and 072,059 "SPACE AND TIME SWITCH"—Reginald Ratcliff; assigned to the assignee of the present application.

TECHNICAL FIELD

This invention generally pertains to a telephone system, and more particularly to conference bridge circuitry for facilitating telephone conference calls.

BACKGROUND ART

Telephone conferencing is the process of connecting three or more parties so that a three-way telephone conversation can be conducted. There are many different conferencing algorithms. One of the simplest algorithms to implement in an analog switch entails simply bridging all parties on a common talk path. This essentially creates one big party line that works well in conventional analog switches for three or four, or maybe even five, parties. Above five parties, serious transmission degradation occurs because of line impedance variations. Circuit loading and signal hogging caused by these line impedance variations can result in serious transmission degradation. Various algorithms based on selecting the most likely party to talk and forcing all other parties to listen have been used, but all suffer from the common problem that the talker chosen by the conference circuit is not always correct. In larger conferences, with a mixture of off premise stations and outside parties, especially where specialized common carrier facilities are used, it is very likely that the outside parties will never be able to talk.

With digital switches, direct bridging is not possible, but can literally be simulated by summing the samples of all parties and transmitting the result to all. This simulation is extremely easy to implement, but results in a sidetone level of zero decibels because each party gets back its own sample, as part of a grand total, at the same level that it went out. This problem can be solved by subtracting each party's sample from the grand total before sending the grand total back to each party. Unfortunately, this increases the complexity of the circuitry required, since there are as many different outputs as inputs.

The modified algorithm works well for three parties; with four or more parties, two of the inherent properties of digital systems cause difficulty. The first difficulty is caused by the four wire nature of digital switches. Substantially all telephone instruments and most trunk facilities are two-wire devices, simultaneously transmitting and receiving on a single pair of wires. Since the switch itself is a four-wire device, with separate transmit and receive paths, a hybrid conversion circuit is used to separate the two directions at the two-wire interface. The hybrid conversion circuit is always imperfectly balanced and results in reflection of some of the incident energy. This reflected energy may be attenuated as little as twelve to fourteen decibels, meaning the transmit sample from a port may contain a voltage which is about a quarter of that sent to the port as a receive sample.

This twelve to fourteen decibels of attenuation is more than adequate for normal two party conversations. In large conferences, however, each party reflects energy which is summed. With five parties in a conference, each reflecting a quarter of the incident voltage, the summation of these reflections is equal to the contribution of the speaking party. Besides creating an undesirable sidetone level of zero decibels, depending on the reflection phase angles and path delays, significant positive feedback can result causing undesirable hollowness, ringing or even oscillation.

Another problem is related to the hard-limiting characteristic of $\mu$ law PCM systems. The dynamic range of the $\mu$ companding law has been carefully optimized for two party conversations considering the statistical properties of voice signals. Since separate voice signals, such as those of the various parties in a large conference, are uncorrelated, except for the component due to reflection, doubling the number of simultaneous potential talkers raises the total average voice signal power by about three decibels. The peak signal voltage however, can theoretically increase by about six decibels since the uncorrelated nature of the signals does not affect the possibility that all parties can be, for any given sampling instant, producing maximum code words. Thus, a four party conference can have an average power six decibels, or four times that of a single speaker, with voltage peaks twelve decibels higher.

An eight party conference can have an average power nine decibels higher with 18 decibel higher peaks. This has three consequences. First, the number of bits used to represent the grand total must be large enough to prevent overflow and rollover. Alternatively, logic must be provided to detect overflow and replace the sum up with a maximum level code word of appropriate polarity. Second, the output linear to $\mu$ law conversion must be able to handle larger code words than is specified for $\mu$ law and convert them to the appropriate maximum level $\mu$ law words. The third consequence is that the probability of clipping is significantly increased over that for a single party. Clipping probability is not multiplied by the number of parties for a number of reasons, the most important being psychoacoustic. Participants in a conference generally take turns, and even during contention, not all conferees participate. It will be appreciated that it would be highly desirable to have an electronic telephone system that makes effective telephone conferences possible.

In prior conferencing bridges, a PROM was used at the output of the arithmetic unit to handle overflow and zero substitution. The PROM introduced undesirable delay. To compensate for the delay caused by the PROM, faster, more complex circuitry was used. Unfortunately, the faster circuitry is expensive. It will be appreciated that it would be highly desirable to have a conferencing bridge that eliminates the speed penalty of the PROM.

SUMMARY OF THE INVENTION

The present invention is directed to overcoming the problems set forth above. Briefly summarized, a conferencing bridge supports a telephone conversation involving more than two parties wherein each party transmits a unique PCM bit stream and receives a unique PCM bit stream. The conferencing bridge receives first and second incoming serial PCM highways carrying the transmit and receive PCM bit streams and converts the serial data on the PCM highways to parallel data. An arithmetic logic unit implements a conferencing algorithm and produces a PCM output. The output from the arithmetic unit is separated by output highway and converted back to serial data streams.

It is an object of the invention to provide an electronic telephone system with the ability to support conversations involving more than two parties. It is a feature of this invention that the foregoing object is accomplished by a conferencing bridge which facilitates conferences of up to eight parties. Each conferencing bridge allows sixty-four parties to conference in any combination ranging from three to eight parties per conference. An advantage provided by this feature of the conferencing bridge is effective conferences among the sixty-four parties in groups of up to eight parties at a time.

It is an object of the invention to provide a conferencing bridge which implements a conferencing algorithm using simple arithmetic operations. It is a feature of this invention that the foregoing object is accomplished by the conferencing bridge circuitry comprising two RAMs, two binary adders, PROMs to convert eight bit compressed PCM data to and from fourteen bit linear values, input and output shift registers, several buses and registers, and the control circuitry to drive it all. An advantage provided by this feature of the conferencing bridge is that the algorithm is accomplished by moving data between the RAMs and the adder and the PCM interface via the various buses and registers. The conferencing bridge circuitry implements the algorithm by summing each party's contribution to the conference, deriving a grand total, and subtracting each party's contribution from the grand total.

Another object of the invention is to provide an electronic telephone system with conferencing capability in an efficient and inexpensive manner. It is a feature of this invention that the foregoing object is accomplished by the conferencing bridge circuitry. The conferencing bridge circuitry does not require the arithmetic unit results to pass through a PROM for overflow or zero substitution thereby reducing the total propagation delay and allowing slower components to be used. An advantage provided by this feature of the conferencing bridge is that slower and less expensive RAMs, PROMs, and arithmetic logic integrated circuits can be used and fewer programmable memories are required.

Another object of the invention is to implement the conferencing algorithm using simple arithmetic operations while minimizing the effects of singing, echo problems, and the hard-limiting characteristics of $\mu$ law PCM systems. It is a feature of this invention that achievement of the foregoing object is aided by optionally scaling each party's contribution to the conference by about three decibels. An advantage provided by this feature of the conferencing bridge is that overload problems are alleviated. Also, the singing margin in large conferences is vastly improved.

Still another object of the invention is to eliminate the speed penalty associated with using a PROM at the output of the arithmetic unit. This object is achieved by eliminating the PROM and using gates to substitute zero's or valves for overflow conditions. This eliminates the speed penalty simply and inexpensively.

Other objects, features, and advantages will become apparent to those skilled in the art upon reading the detailed description in conjunction with the accompanying drawings and appended claims.

DETAILED DESCRIPTION OF THE PREFERRED EMBODIMENT

Figure 1:
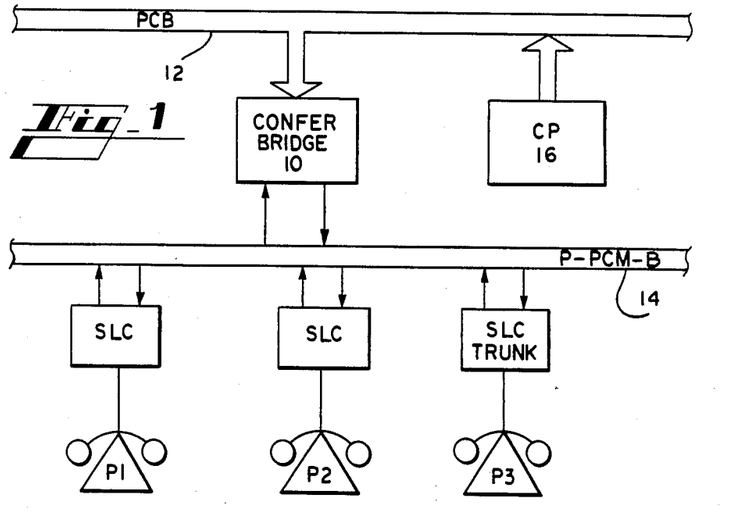
FIG. 1 is a block diagram of a preferred embodiment of an electronic telephone system incorporating a conferencing bridge in accordance with the present invention.

Referring to FIG. 1, a conferencing bridge 10 provides conferencing capability for an electronic telephone such as the Senior EXEC System manufactured by Solid State Systems, Inc., 1300 Shiloh Road N.W., Kennesaw, Ga., 30144. The electronic telephone system includes a peripheral control bus 12, a peripheral PCM bus 14, and a control processor 16. The conferencing bridge 10 provides the electronic telephone system with the ability to support conversations involving more than two parties. A conference with three parties, P1, P2 and P3 is illustrated in FIG. 1. All parties may be station line callers (SLC) or some parties may be trunk callers (TRUNK). Each party transmits a unique PCM bit stream via peripheral PCM bus 14 to the conferencing bridge 10 and receives a unique PCM bit stream via peripheral PCM bus 14 from the conferencing bridge 10.

The conferencing bridge 10 can accommodate up to sixty-four parties in one conference. Because of central processor software restrictions, however, each conferencing bridge 10 accommodates sixty-four conferenced parties in any combination of three to eight parties per conference. The conferencing bridge 10 is connected to the electronic telephone via two full duplex PCM highways, each supporting thirty-two paths. Each of the sixty-four parties is associated with a command byte that determines the conference a party is a member of, whether the party's contribution should be scaled by 0.707 (called greater than four flag) and whether a party is an odd or even member of the conference.

The architecture of the Senior EXEC System is more fully explained in applications Ser. Nos. 071,979, 072,249 and 072,059, which are incorporated herein by reference. The switching architecture is a conventional fixed time-slot/central memory-time switch structure. The switching architecture consists of a number of groups each connected to one PCM highway of a central memory time switch (CMTS). Each PCM highway supports thirty-two PCM time slots in each direction. Two of the groups are combined and contain a sixty-four port conference bridge module. The conference dual groups resides in the common equipment shelf. The conference dual group consists of a single module (conference bridge 10) connected to the CMTS by two highways.

The control architecture of the digital telephone system is a distributed multi-processor scheme with a common central computer communicating directly with peripheral devices and special purpose devices. All communication between the central computer and devices located in the common equipment and universal port shelves is accomplished indirectly. The central computer communicates with the shelf microprocessor and the shelf microprocessor communicates with the devices in the shelves.

Each shelf microprocessor module has two external bus structures: the peripheral bus (PB), and the expansion bus (EB). Both the PB and EB extend a portion of the internal microprocessor bus to make the various registers on the other shelf modules appear as memory mapped I/O to the microprocessor. The PB and EB are separately buffered, but otherwise identical. Each consists of eight-bit directional data line, address lines, a read strobe, and a write strobe. The microprocessor module located in the common equipment shelf communicates with the conference bridge via its peripheral bus.

The conference bridge 10 creates a conference by summing the receive PCM data of all parties in the conference and returning to each party the sum, less the party's contribution to the sum. The receive and transmit PCM for any party is on the same numbered bus and time-slot. The conferences are set up by establishing a command byte for each party containing the conference number. Commands are isssued through the peripheral control bus 12. The peripheral control bus contains sixty-four command registers, each directly associated with one of the sixty-four PCM bus-time-slot combinations entering and exiting the conferencing bridge 10. The command registers control which conference the party in the associated time-slot is a member of, and informs the conference circuitry the contribution should be scaled by 0.707, whether the party is an odd or even member of the conference, and if the conference sum should be held reset (0).

Figure 2:
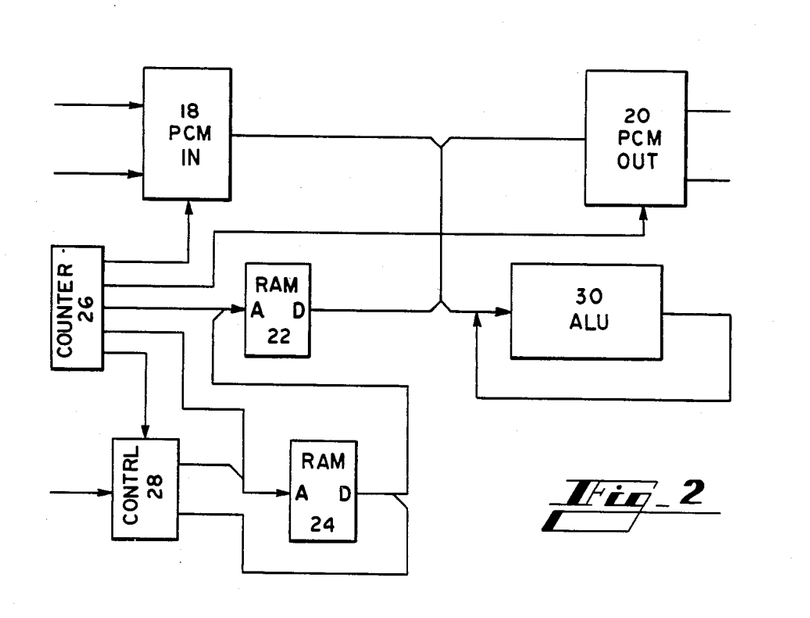
FIG. 2 is a block diagram of a preferred embodiment of the conferencing bridge of FIG. 1 illustrating the basic components of the conferencing bridge.

Referring to FIG. 2, the conference bridge 10 contains PCM input and output modules 18 and 20. The conferencing bridge 10 also includes a speech RAM 22, a command RAM 24, a counter 26, a control interface 28 and an arithmetic logic unit 30. Basically, the conferencing bridge circuitry is a collection of two RAMs, two binary adders, PROMs to convert 8-bit compressed PCM data to and from 14-bit linear values, input and output shift registers, several buses and registers, and the control circuitry that drives it all.

Figure 3:
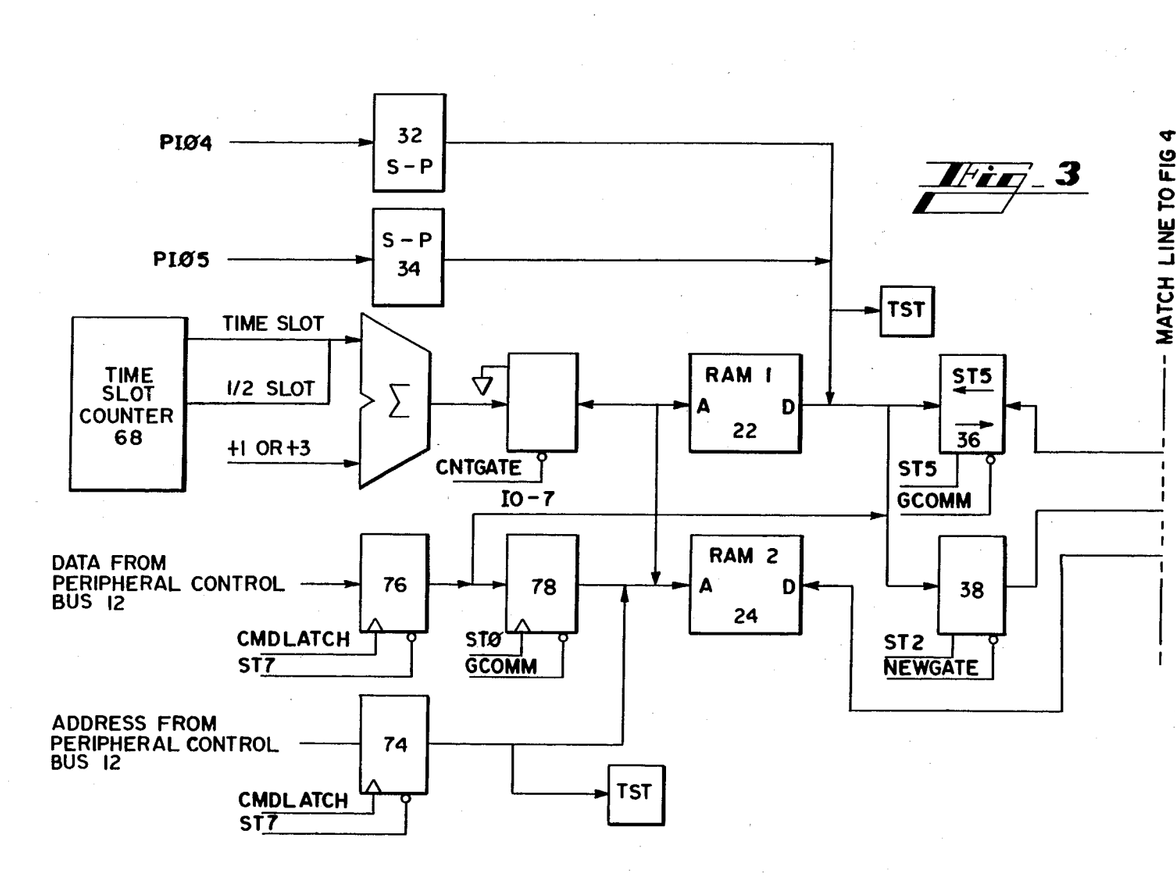
FIGS. 3 and 4 are block diagrams of the conferencing bridge of FIGS. 1 and 2 shown in greater detail connected along the match line.
Figure 4:
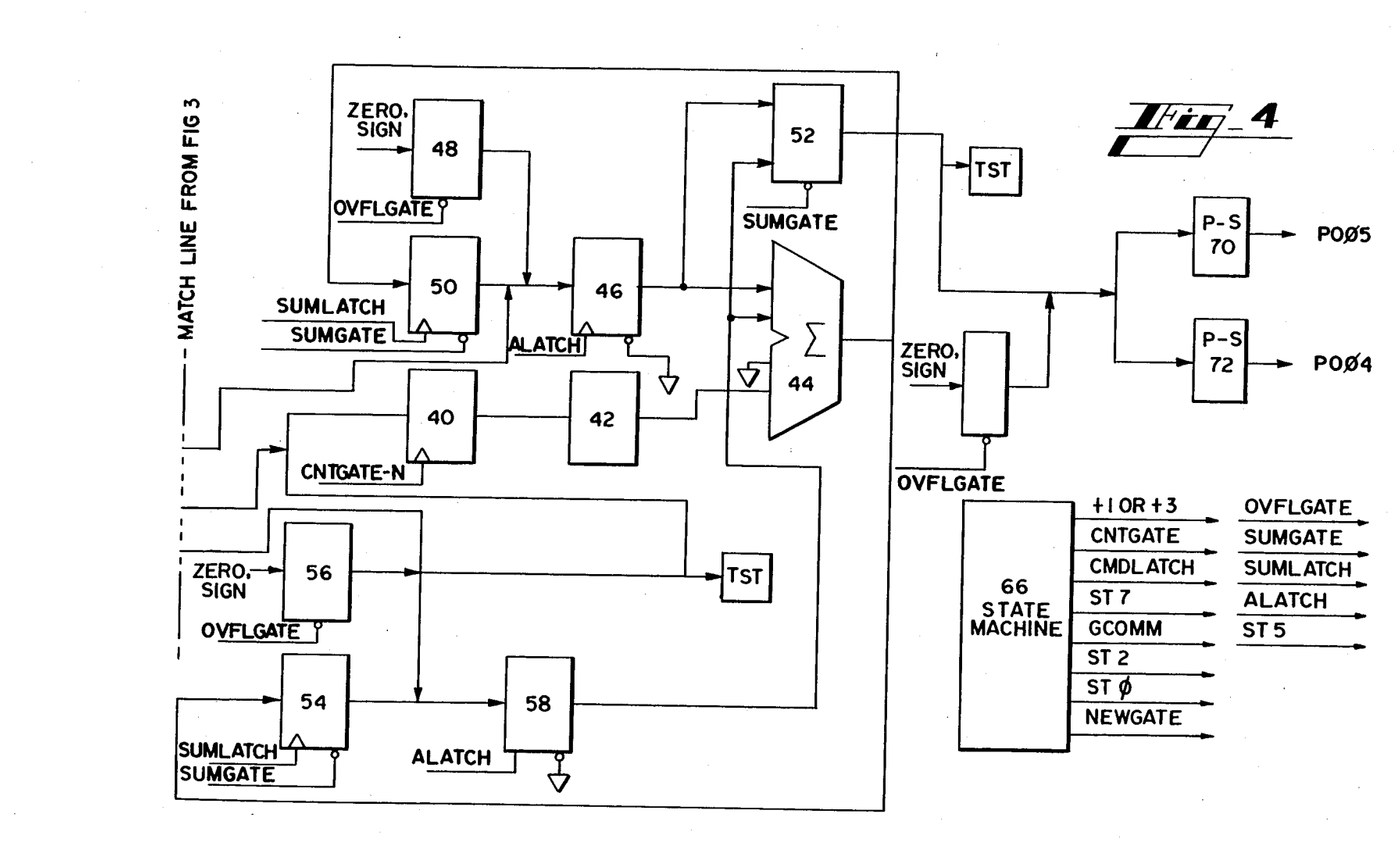

Referring to the block diagrams of FIGS. 2-4, the PCM input block 18 receives the two incoming serial PCM highways PI04 and PI05. Two serial to parallel converters 32, 34 buffer the incoming serial data and convert the serial data to parallel data. The resulting sixty-four bytes per frame (32 from each highway) are then gated to the speech RAM 22 under control of the counter 26. The speech RAM 22 provides temporary storage for the sixty-four most recent input samples, called new values, the previous sixty-four samples, called old values, and the sixty-four conference sums.

The arithmetic logic unit 30 performs the arithmetic operations required to implement the conferencing algorithm. From RAM 22 data is gated to bidirectional buffer 36 and transparent latch 38. From the transparent latch 38 the data goes to latch 40 to an 8-to-14-bit conversion PROM 42 and on to 16-bit adder 44. Data from the bi-directional buffer 36 is input to latchable tri-state buffer 46 along with data from tri-state buffer 48 and latchable tri-state buffer 50. The output of latch 46 is input to the 16-bit adder 44 and to a 14-to-8-bit conversion PROM 52. The output of the adder 44 is input to latchable tri-state buffer 50 and to latchable tri-state 54. Data from RAM 24, a buffer 56 and buffer 54 are input to latchable tri-state buffer 58 then to the adder 44 and PROM 52. The output of PROM 52 and buffer 60 are input to parallel to serial converters 62, 64 at the output. As mentioned, the arithmetic logic unit 30 performs addition and subtraction operations to implement the conferencing algorithm.

The PCM input and output values are preferably in the standard $\mu$ law companded format commonly used in North America, or maybe in a law commonly used in Europe. The standard $\mu$ law companded format is a piecewise linear approximation to a logarithmic curve. In order to properly perform the sample summations and subtraction, the input data is first converted to an equivalent linear format and the resulting data is transformed from the linear format back to $\mu$ law. In addition, large conferences, those with more than four parties, often require that the contributions of all parties be attenuated by three decibels in order to control singing and echo problems. This is easily accomplished in combination with the $\mu$ law to linear conversion by using double table. One table corresponds to $\mu$ law as defined and the other with the magnitudes scaled by 0.707. Table selection is controlled by the greater than four flag bit in the command word. Mu law has a dynamic range of $\pm 8159$, so the number of bits required for the linear representation is 13-bits plus, giving a range of $\pm 8192$. In order to use standard arithmetic logic unit devices to perform addition and subtraction, the linear representation used is signed two's complement. To further reduce the probability of singing or echo problems in conferences, half the parties in a conference are inverted in phase before summation by complementing the sign bit of the $\mu$ law input signal. Two's complement representations are not symmetric around zero, so sign reversal must be accomplished before linear conversion.

The counter block 26 is a combination state machine 66 and time-slot counter 68. The time-slot counter 68 determines which PCM bus time-slot is being handled and the state machine 66 directs the various other blocks through the steps that accomplish the conference algorithm for each of the bus time-slot combinations.

The PCM output block 20 includes two parallel to serial converters 70, 72 to accept the 8-bit wide sequence of PCM output samples from the arithmetic logic unit 30, separate the samples by output highway, and convert the samples to serial 2.048 Mbit/s data streams that are placed on the two PCM output highways. This is accomplished by the use of the dual rank parallel input, serial output shift registers 70 and 72.

The control interface 28 accepts path select and command bytes from the peripheral control bus 12 and holds the path select and command bytes until the control interface 28 transfers them to the command RAM 24. The control interface 28 includes an address latch 74 and a data latch 76 to permit control of the conference bridge 10. The output from data latch 76 is buffered by buffer 78 before being received by the command RAM 24. The command RAM 24 stores the command byte associated with each of the sixty-four parties or cells to the conference. Each cell location is read during the appropriate time-slot to select the values presented to the arithmetic logic unit 30 and to control the digital attenuator and polarity reversal circuits. The conferencing bridge 10 contains sixty-four conference cells, each assigned a fixed time-slot on one of the two PCM highways. Each cell can be made a member of any one of thirty-two conferences and any conference can have up to eight members.

Figure 5:
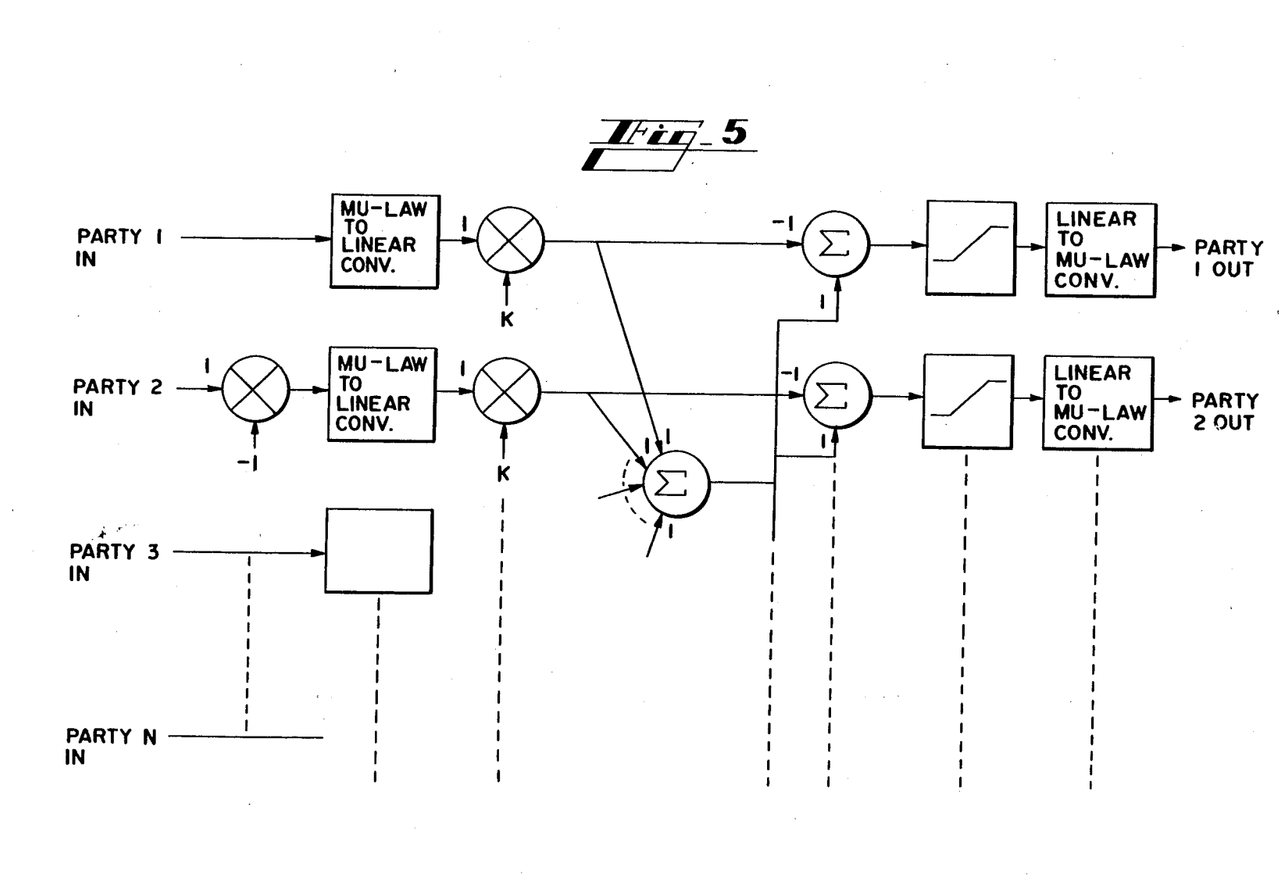
FIG. 5 is a block diagram illustrating the algorithm implemented by the conferencing bridge of FIGS. 1 through 4.

The flow chart of FIG. 5 illustrates the concept of the conferencing algorithm implemented by the conferencing bridge 10. Basically, the conferencing algorithm adds the receive contributions of all parties in the conference arriving at a grand total and returns to each party the grand total minus the individual party's contribution to the grand total. Optionally attenuating each party's contribution to the conference by three decibels is an enhancement significantly reducing oscillation, ringing, hollowness and other problems. This not only alleviates the overload problems, but also has the benefit of vastly improving the oscillation margin of large conferences. The reduction in perceived signal level experienced by conferees is small, in fact far less than that caused in an analog switch by simple path bridging. The algorithm resulting from enhancement to simple summation is illustrated in FIG. 5. Alternate parties are phase inverted (multiplied by (−1)), then all samples are converted to 14-bit two's complement data, attenuated by three decibels (multiplied by 0.707), if more than four parties are in the conference, and then summed in the 16-bit adder to create a grand total. Each party's return signal is generated by subtracting its own contribution from the grand total, limiting the result, and converting back to μ law.

Operation of the conferencing bridge circuitry is believed to be apparent from the foregoing description, but a few comments will be added for emphasis. The controller 28 and arithmetic logic unit 30 have an inner cycle and an outer cycle. The inner cycle implements the conferencing algorithm and performs transfers between the speech RAM 22, PCM input 18, PCM output 20 and the control interface 28. The outer cycle increments the time-slot counter.

The conference algorithm is accomplished by moving data between the two RAMs 22, 24, the adder 44 and the PCM input interface 18 via the various buses and registers under the orchestration of the state counter 26. The state counter 26 steps through sixteen states every PCM time-slot. Seven states each are dedicated to the two buses 12, 14 serving the conferencing bridge 10.

Several aspects of the conferencing algorithm are not explicitly shown in the drawing figures. For example, phase inversion for alternate parties is accomplished by exclusive ORing the odd flag bit from the PCM command register with the sign bit from the PCM input data register and feeding the result to the sign bit input of the μ law to two's complement converter. Similarly, the flag bit from the PCM command register is ORed to the μ law to two's complement converter where it is used to select two different conversion tables. The reset flag bit from the PCM command register clears the sum and old PCM data ensuring the grand total will start at zero when a conference is built and the reset flag is cleared. Reset must be present for at least one full frame period, approximately 125 μs, before the conference port can be reused.

As mentioned, the state counter 26 steps through sixteen states every PCM time-slot. Seven states each are dedicated to the two buses 12, 14 the conferencing bridge 10 serves. During every seven state cycle a PCM word that was shifted in during the previous time-slot is transferred from the PCM input shift register 18 and stored for later use. Also, a new PCM word is generated and sent to the PCM output shift register 20 to be shifted out during the following time-slot. Conference commands are stored in a RAM location corresponding to each time-slot. The data for a time-slot must be generated during the previous time-slot because the data to be shifted out during a time-slot must be ready before that time-slot begins. Therefore, during conference bridge states accessing data stored according to time-slot numbers, the binary encoded time-slot number supplied by counter 26 is increased by one for use in accessing the RAMs 22 and 24. This allows the commands from the microprocessor of the electronic telephone system to be stored directly without address translation.

Increasing the encoded time-slot number by one has a complicating effect on addressing the data retrieved from the PCM bus 14. The data that is moved from the PCM input shift register 18 into RAM 22 was acutually shifted in during the previous time-slot. For any conference cell, the receive and transmit data is on the PCM bus 14 at the same time. The preferred implementation chosen to handle the difference between the current time-slot, the time-slot for which the conference bridge is generating new data (current plus one), and the time-slot from which the new receive data originated (current minus one), is to store the new data at an address current plus one and read the stored data from current plus three.

To better illustrate how time-slot counting works, assume that time-slot numbers count from 0 to 31 as time increases. For this example, time-slot 6 will be the slot for which a new PCM word is to be generated. This new PCM word must be generated during time-slot 5, so 5 is incremented by 1 when reading the command to be executed from the RAM. However, the receive data for time-slot 6 was stored during time-slot 7 of the previous frame and was stored in address 8 (7+1). Therefore, the data to be added in the conference sum during time-slot 5 must be read from location 8 (or 5+3). Thus the current plus 1 and the current plus 3 factors originate in the one time-slot difference both ways between when the PCM data is on the bus and when it can be loaded to or read from the shift registers. Time-slots are actually counted from 31 down to 0. This is handled by an up counter and inverting the address bits of the command from the microprocessor.

As mentioned, the state counter 66 steps through sixteen states every PCM time-slot. Seven states each are dedicated to the two buses 12, 14 that the conference bridge 10 serves. State zero is the first state. The first order of business is to read the command word that will determine many of the actions taken during the cycle. The commands are stored in RAM 22, addressed by time-slot. To read the command, the time-slot count, augmented by 1, is gated to the address bus of the RAMs 22 and 24. Bits 0-4 carry the time-slot count, while bit 5 determines which bus (4 or 5) is being handled. Bits 6 and 7 are set to 0 to select the portion of the RAM used for command storage. The portion of the command byte read from the RAM which designates conference number (bits 0-4) is latched where it drives the address bus when necessary. The three control bits (conference reset, greater than four, and odd/even) are latched and made available throughout the cycle. The corresponding old data is read form RAM 24. It is stored at the same address as the commands in RAM 22. It is then latched where it drives an 8-to-14 bit conversion PROM 42, which drives the B side of the 16-bit adder 44.

State one is the second state wherein the conference number latched in state zero is gated onto the RAM address bus. Bits 6 and 7 of the address are set to 1 and 0, respectively, to select the portion of memory that stores sums. The upper 8-bits of the sum from RAM 22 are gated through a bidirectional buffer 36 and latched at the A input of the 16-bit adder 44. The lower 8-bits of the sum are read from RAM 24 and also latched at the A input of the adder 44.

In state two, the sign of the old data latched at the B input of the adder 44 is reversed resulting in the output of the adder 44 equalling the sum minus the old data. The output of the adder 44 is then latched. The new data is read from RAM 22 which is addressed by the time-slot counter 68 augmented by 3. Bits 6 and 7 of the address bus are set to 0 and 1, respectively, to select the area of memory where new PCM data is stored. The new data is passed through a transparent latch 38 and presented to the input of the latch 58 which drives the 8-to-14 bit conversion PROM 52. At the end of state two, the new data is stored in both of these latches. The transparent latch 58 holds the new data until state six, when it is stored in RAM 24 becoming old data.

In state three, the result of state two's addition is gated from one pair of latches to another. If the reset command bit is set true, a zero is gated and latched instead of the adder result. Or, if an overflow was detected, then a positive or negative maximum 16-bit value is substituted. The substitution is accomplished by enabling OVFLGATE instead of SUMGATE. The signals ZERO and SIGN determine what is substituted.

In state four, the 16-bit result of state two (or the substituted value), is presented to the A input of the adder 44 and the new PCM data (converted to 14-bits) is presented to the B side and the resulting sum is latched. The result of state two is also presented to the 14-to-8-bit conversion circuitry 52. The output of this, or a substitute zero or maximum, is then loaded into the PCM output shift register 20. In state five, the RAMs are addressed by the latched command byte to select the sum location. The summation result of state four is stored in the RAMs to replace the one read out in state one. The upper 8-bits (or a substituted 0 or maximum) are gated from a data latch 76 through the bidirectional buffer 36 and to the data port of RAM 22. The lower 8-bits (or substitute values) are gated directly to the data port of RAM 24.

In state six the RAMs are addressed by the time-slot counter, augmented by one. Fresh PCM data from the input shift register 18 is written into RAM 22 to replace the new data read out in state two. The new data stored in the transparent latch 38 in state two is stored into RAM 24. Between state two and state six, this data is moved from RAM 22 to RAM 24 to become old data replacing that read in state zero.

In state seven, if the microprocessor has written a new command to the conference bridge 10, it is stored as eight data bits and 6 address bits. The data bits are gated to the data port of RAM 22 and the address bits (with bits 6 and 7 set to 0) are gated to the RAM address bus, and the data is written into RAM 22. A set of flip-flops ensure that the data from the microprocessor is stable before state seven starts. If there is no new command, then no write strobe to RAM 22 occurs.

As mentioned, the 8-bit data from the PCM bus is converted to a linear format for binary addition. This is required because the 8-bit data is a non-linear coding of 14-bit linear data. The conversion is performed by two 512-by-8 PROMs. The 8-bit compressed PCM addresses the PROMs along with the greater than four bit. The greater than four bit chooses one of two possible values for each 8-bit PCM value. If the greater than four bit is false, the normal 14-bit value is read from the PROMs, if it is true, then a value that is equivalent to a three decibel attenuation of a normal value is read. The PROMs together provide a 14-bit value, which is sign extended to 16-bit for presentation to the adder circuitry. The 8-bit values are sign magnitude, therefore the polarity can be reversed by inverting the sign bit. This ability is used in state two to subtract instead of add the old data. When the odd/even bit is set to odd, the sign bit is reversed again, so that in one sense the old data is added and the new data is subtracted. The 8-to-14-bit conversion PROMs put out a two's-bit complement representation as required for the binary adder. Another PROM, of a size 16K-by-8 (14 address lines), converts the linear binary output of the adder into the required 8-bit non-linear PCM format. Although the adder produces a 16-bit result, all inputs to it are 14-bit values from the 8-to-14-bit conversion PROMs, and overflow into the upper two bits has been found to be extremely rare. Therefore, the lower 13 bits plus the most significant bit are used to address the 14-to-8 bit conversion PROM.

It will now be appreciated that there has been presented an electronic digital telephone system with the ability to support conversations involving more than two parties. A conference bridge facilitates conferences of up to eight parties with each conference bridge allowing sixty-four parties to conference in any combination ranging from three to eight parties per conference. Simply stated, the conference bridge circuitry implements a conferencing algorithm by summing each party's contribution to the conference, deriving a grand total, and subtracting each party's contribution from the grand total. The effects of singing, echo problems and the hard-limiting characteristic of $\mu$ law PCM systems is minimized by scaling each party's contribution to the conference by about three decibels.

While the invention has been described with reference to a preferred embodiment, it will be understood by those skilled in the art that various changes may be made and equivalents may be substituted for elements thereof without departing from the true spirit and scope of the invention. For example, while the invention has been described with reference to $\mu$ law, any eight-bit companded format can be used by substituting an appropriate PROM. In addition, many modifications may be made to adapt a particular situation and component to the teachings of the invention without departing from the essential teachings of the present invention. It is accordingly intended that the present invention cover such modifications which do not depart from the true spirit and scope of the invention.

I claim:

1. A conferencing bridge for supporting a telephone conversation involving more than two parties wherein each party transmits a unique PCM bit stream and receives a unique PCM bit stream; comprising:
    means for receiving first and second incoming serial PCM highways carrying said transmit and receive PCM bit streams;
    means for converting serial data on said PCM highways to parallel data;

arithmetic logic means for implementing a conferencing algorithm and producing a sequence of PCM outputs;

means for providing valid output PCM data when an arithmetic overflow occurs without passing said arithmetic logic unit output through a PROM so that propagation delay is minimized;

means for providing valid output PCM data when a sum is being cleared without passing said arithmetic logic unit output through a PROM so that propagation delay is minimized; and means for receiving the PCM outputs from said arithmetic logic means, separating said outputs by highway, and converting said outputs to serial data streams.

2. A conferencing bridge according to claim 1 wherein said algorithm comprises:
   phase inverting alternate parties;
   converting the data to fourteen bit two's-complement data; and
   summing the data creating a grand total.

3. A conferencing bridge according to claim 2 wherein said algorithm further comprises attenuating said fourteen bit two's-complement data by about three decibels whenever so commanded.

4. A conferencing bridge according to claim 2 wherein said algorithm further comprises generating a return signal for each party by subtracting each party's own contribution from said grand total.

5. A conferencing bridge according to claim 2 wherein said means for providing valid output PCM data when an arithmetic overflow occurs includes a logic gate substituting a zero or a predetermined value in response to an overflow condition.

6. A conferencing bridge according to claim 1 wherein said means for providing valid PCM output data when a sum is being cleared includes a logic gate substituting a zero or a predetermined value in response to a sum being cleared.

7. A conferencing bridge according to claim 6 further comprising means for selectively attenuating said fourteen bit two's-complement data by about three decibels.

8. A conferencing bridge according to claim 6 further comprising means for generating a return signal for each party by subtracting each party's own contribution from said grand total.

9. A conferencing bridge according to claim 1 wherein said conferencing bridge can accommodate up to sixty-four parties in a conference.

10. A conferencing bridge for supporting a telephone conversation involving more than two parties wherein each party transmits a stream of unique PCM data bits and receives a stream of unique PCM data bits; comprising:
    input means for receiving first and second incoming serial PCM highways carrying said transmit and receive PCM data and converting data on said PCM highways to parallel data;
    means for temporarily storing samples of said parallel data;
    means for storing a command byte associated with each of the parties to the conversation;
    arithmetic logic means for implementing a conferencing algorithm by performing sample summations and subtractions and producing PCM outputs;
    means for receiving the PCM outputs from said arithmetic logic means, separating said outputs by highway, and converting said outputs to serial data streams.

11. A conferencing bridge according to claim 10 further comprising logic gate means for providing valid output PCM data when an arithmetic overflow occurs.

12. A conferencing bridge according to claim 10 further comprising logic gate means for providing valid output PCM data when a sum is being cleared.

13. A conferencing bridge according to claim 10 wherein said input and output PCM data are in standard $\mu$ law companded format which is a piecewise linear approximation to a logarithmic curve and wherein said arithmetic logic means includes means for converting said input data to an equivalent linear format prior to performing sample summations and subtractions and afterwards transforming the data back to $\mu$ law companded format.

14. A conferencing bridge according to claim 13 wherein the equivalent linear format is signed two's complement.

15. A conferencing bridge according to claim 10 further comprising means for scaling contributions of each party to the input data.

16. A conferencing bridge according to claim 10 further comprising means for attenuating contributions of each party to the input data by about three decibels.

17. A conferencing bridge according to claim 10 wherein said input and output PCM data are in eight bit compressed format and wherein said arithmetic logic means includes means for converting said eight bit compressed data to fourteen bit linear format prior to performing sample summations and subtractions and afterwards transforming the fourteen bit linear format back to 8-bit compressed format.

18. A conferencing bridge according to claim 10 wherein said algorithm comprises:
    phase inverting alternate parties;
    converting the data to fourteen bit two's-complement data; and
    summing the data creating a grand total.

19. A conferencing bridge according to claim 18 wherein said algorithm further comprises attenuating said fourteen bit two's-complement data by about three decibels whenever so commanded.

20. A conferencing bridge according to claim 18 wherein said algorithm further comprises generating a return signal for each party by subtracting each party's own contribution from said grand total.

21. A conferencing bridge according to claim 18 further comprising:
    generating a return signal for each party by subtracting each party's own contribution from said grand total;
    limiting the result; and
    converting back to $\mu$ law.

22. A conferencing bridge according to claim 18 further comprising:
    means for phase inverting alternate parties;
    means for converting the data to fourteen bit two's-complement data; and
    means for summing the data creating a grand total.

23. A conferencing bridge according to claim 22 further comprising means for selectively attenuating said fourteen bit two's-complement data by about three decibels.

24. A conferencing bridge according to claim 22 further comprising means for generating a return signal for each party by subtracting each party's own contribution from said grand total.

25. A conferencing bridge according to claim 22 further comprising:
 means for generating a return signal for each party by subtracting each party's own contribution from said grand total, limiting the result, and converting back to μ law.

26. A conferencing bridge according to claim 10 wherein said PCM outputs from said arithmetic logic means are directly input to said receiving means without passing through a PROM that accomodates arithmetic overflow and zero substitution.

27. A conferencing bridge for supporting a telephone conversation involving more than two parties wherein each party transmits a stream of unique PCM data bits and receives a stream of unique PCM data bits; comprising:
 input means for receiving first and second incoming serial PCM highways carrying said transmit and receive PCM data and converting data on said PCM highways to parallel data;
 a first RAM means for temporarily storing samples of said parallel data;
 a second RAM means for storing a command byte associated each of said parties to the conference, said first and second RAM means being the only RAM means required for the PCM highways:
 arithmetic means for implementing a conferencing algorithm by performing only arithmetic functions and producing PCM outputs;
 means for receiving the PCM outputs directly from said arithmetic means without passing through a PROM for minimal propagation delay, separating said outputs by highway, and converting said outputs to serial data streams.

28. A conferencing bridge according to claim 27 further comprising means for providing valid output PCM data when an arithmetic overflow occurs.

29. A conferencing bridge according to claim 28 wherein an overflow gate is enabled in response to an arithmetic overflow thereby substituting a positive or negative sixteen bit value.

30. A conferencing bridge according to claim 27 further comprising means for providing valid output PCM data when a sum is being cleared.

31. A conferencing bridge according to claim 30 wherein a zero is gated and latched instead of an adder result, if a reset bit is set true, when a sum is being cleared.

32. A conferencing bridge according to claim 27 wherein said input and output PCM data are in standard μ law companded format which is a piecewise linear approximation to a logarithmic curve and wherein said arithmetic means includes means for converting said input data to an equivalent linear format prior to performing sample summations and subtractions and afterwards transforming the data back to μ law companded format.

33. A conferencing bridge according to claim 32 wherein the equivalent linear format is signed two's complement.

34. A conferencing bridge according to claim 27 further comprising means for attenuating contributions of party to the input data.

35. A conferencing bridge according to claim 27 further comprising means for attenuating contributions of each party to the input data by about three decibels.

36. A conferencing bridge according to claim 27 wherein said input and output PCM data are in eight bit compressed format and wherein said arithmetic logic means includes means for converting said eight bit compressed data to fourteen bit linear format prior to performing sample summations and subtractions and afterwards transforming the fourteen bit linear format back to 8-bit compressed format.

* * * * *